United States Patent [19]

Farrell et al.

[11] Patent Number: 4,881,842
[45] Date of Patent: Nov. 21, 1989

[54] WHEEL BEARING ASSEMBLY

[75] Inventors: Robert C. Farrell, Frankenmuth; George A. Lundy, Saginaw, both of Mich.

[73] Assignee: General Motors Corporation, Detroit, Mich.

[21] Appl. No.: 259,020

[22] Filed: Oct. 17, 1988

[51] Int. Cl.⁴ .............................................. F16D 1/00
[52] U.S. Cl. .................................... 403/19; 464/178; 301/124 R; 301/112; 384/539; 403/261; 403/359
[58] Field of Search ................. 403/359, 326, 261, 19; 384/544, 506, 539, 585; 180/905, 906, 70.1; 301/112, 111, 124 R, 124 H; 464/178

[56] References Cited

U.S. PATENT DOCUMENTS

| | | | |
|---|---|---|---|
| 2,136,155 | 2/1936 | Spicacci | 384/539 |
| 4,424,047 | 1/1984 | Welschof et al. | 464/178 |
| 4,427,085 | 1/1984 | Aucktor | 464/178 |
| 4,529,254 | 7/1985 | Krude | 301/124 R |

Primary Examiner—Randolph A. Reese
Assistant Examiner—Carol I. Bordas
Attorney, Agent, or Firm—Francis J. Fodale

[57] ABSTRACT

A wheel bearing assembly comprises an outer bearing member which is secured to a steering knuckle, and a hollow spindle which is rotatably supported in a fixed longitudinal relationship in the outer bearing member by two rows of bearing balls. The hollow spindle has a splined bore which receives a splined stub shaft of a drive bell which is pulled through the splined bore by way of a pull groove in the free end of the stub shaft. A snap ring is assembled to the stub shaft to secure the hollow spindle on the stub shaft against the resistance of a deformed crush ring which is disposed between an inboard end of the hollow spindle and a shoulder of the drive bell. In an alternate embodiment the snap ring secures the hollow spindle on the stub shaft against the resistance of interengaging straight and helical spines of the hollow spindle and the stub shaft.

6 Claims, 3 Drawing Sheets

WHEEL BEARING ASSEMBLY

BACKGROUND OF THE INVENTION

This invention relates generally to wheel bearing assemblies and more specifically to wheel bearing assemblies for driven wheels.

The typical wheel bearing assembly for driven wheels comprises a hollow spindle which has a splined bore which receives a splined stub shaft of a drive member. The drive member is conventionally secured to the hollow spindle by a nut on the threaded end of the splined stub shaft.

SUMMARY OF THE INVENTION

The object of our invention is to provide a wheel bearing assembly having a hollow spindle which has a splined bore which receives a splined stub shaft of a drive member and an improved means of securing the drive member to the hollow spindle without the need for threads and bolts.

A feature of our invention is that the drive member is secured to the hollow spindle in a manner which eliminates any lash between the drive member and the hollow spindle.

Another feature of our invention is that the drive member has a stub shaft which has a pull groove at its free end for pulling the stub shaft through the spindle to secure the drive member to the inner bearing member in a lash free manner.

Another feature of one embodiment of our invention is that the drive member is secured to the spindle in a lash free manner through cooperation of a deformed crush ring.

Another feature of another embodiment of our invention is that the drive member is secured to the spindle in a lash free manner through cooperation of interengaging straight and helical splines.

Other objects and features of the invention will become apparent to those skilled in the art as disclosure is made in the following detailed description of a preferred embodiment of the invention which sets forth the best mode of the invention contemplated by the inventors and which is illustrated in the accompanying sheet(s) of drawing.

DETAILED DESCRIPTION OF THE PREFERRED EMBODIMENT

Figure 1:
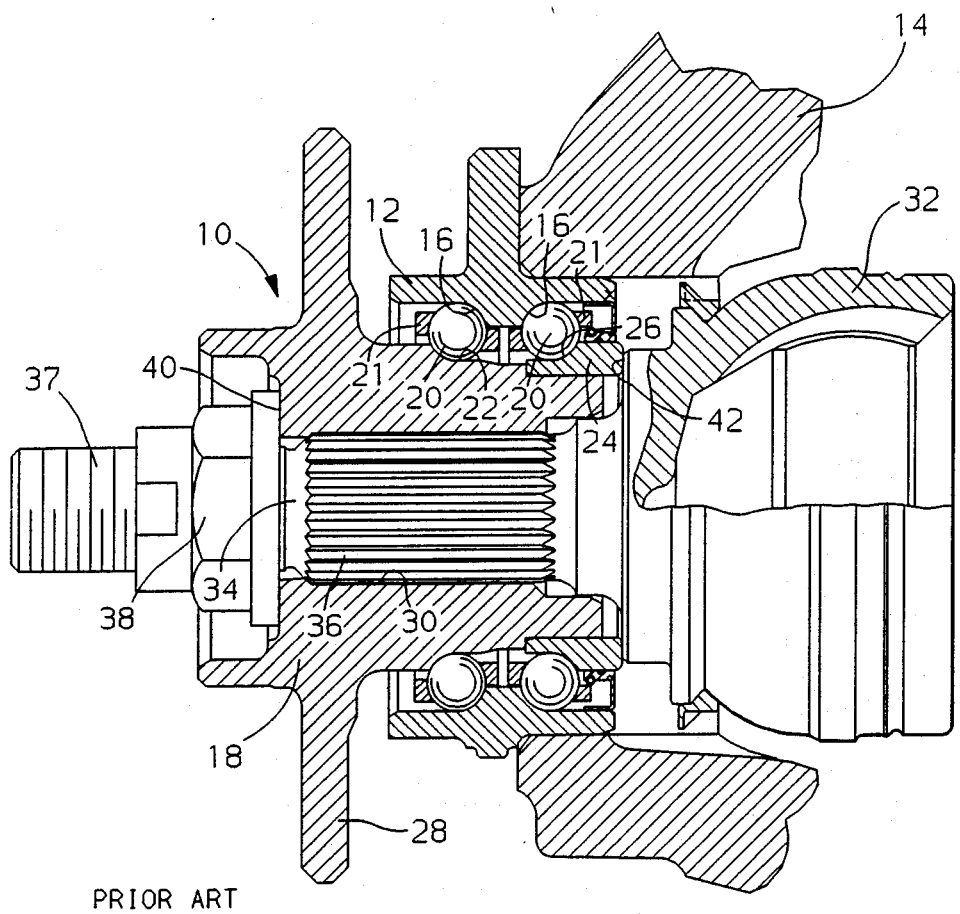
FIG. 1 is a longitudinal section of a known prior art wheel bearing assembly for driven wheels.

Referring now to the drawing, FIG. 1 shows a known prior art wheel bearing assembly 10 for a steerable front driven wheel of an automobile. The wheel bearing assembly 10 comprises an outer bearing member 12 which is secured to a steering knuckle 14 or other suitable support structure of the automobile by bolts or the like (not shown). The outer bearing member 12 has two integral angular contact outer raceways 16.

The wheel bearing assembly 10 further comprises a hollow spindle or inner bearing member 18 and two rows of bearing balls 20. The bearing balls in each row are circumferentially spaced from each other by a conventional separator 21. The inner bearing member 18 has an integral angular contact inner raceway 22 and a separate pressed on race 24 which provides a second angular contact inner raceway 26. The rows of bearing balls 20 ride on the angular contact raceways 16, 22 and 26 and rotatably support the inner bearing member 18 in a fixed longitudinal relationship in the outer bearing member 12.

The hollow spindle 18 has a flange 28 for mounting a vehicle wheel (not shown) in a suitable manner such as by studs and bolts. The hollow spindle 18 also has a splined bore 30 by means of which an outer drive member or drive bell 32 of a front wheel drive axle (not shown) is drivingly connected to the hollow spindle 18. More specifically, the drive bell 32 has an integral stub shaft 34 which has an intermediate splined portion 36 engaging the splined bore 30 and a threaded end portion 37 which receives a nut 38 which is tightened down against a shoulder 40 of the hollow spindle 18 to secure the hollow spindle 18 on the stub shaft 34 against a shoulder 42 of the drive bell 32.

Figure 2:
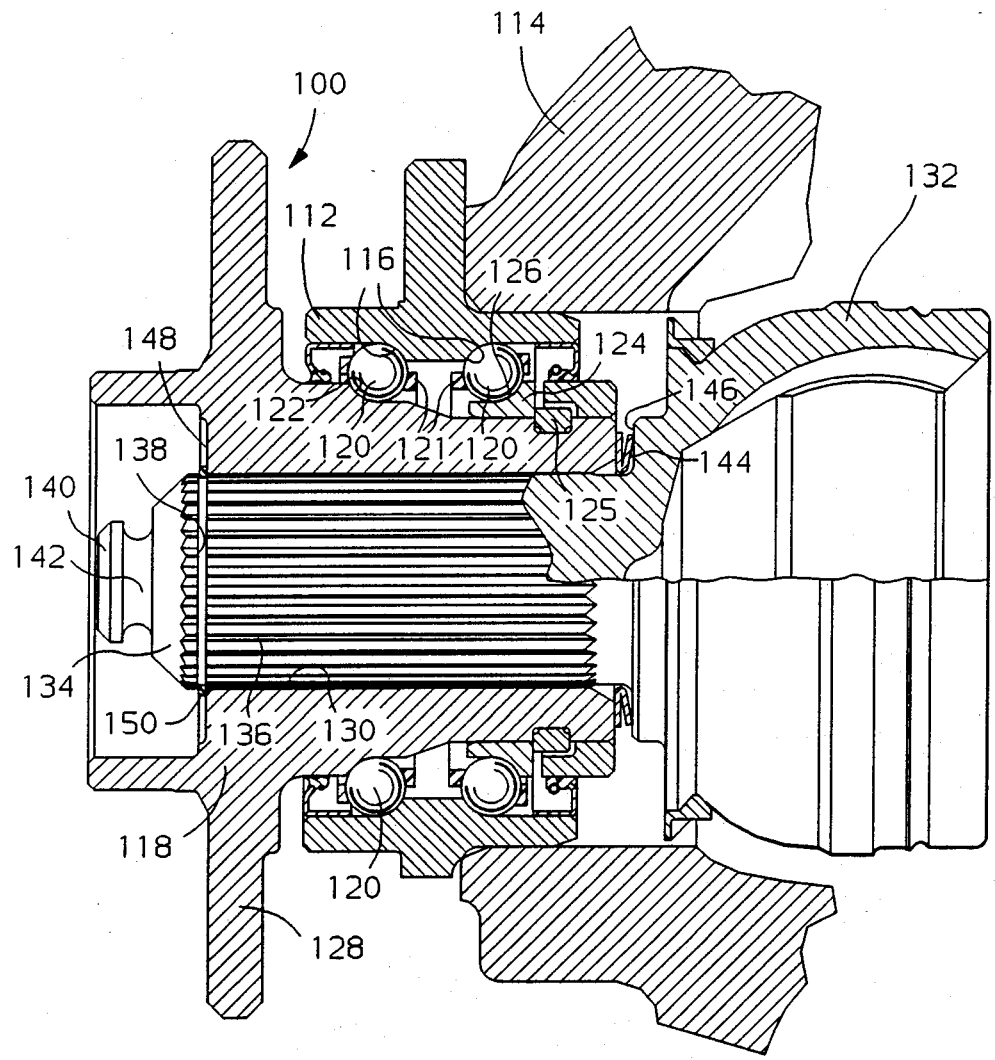
FIG. 2 is a longitudinal section of a wheel bearing assembly for driven wheels in accordance with our invention.

A wheel bearing assembly 100 in accordance with our invention is shown in FIG. 2.

The wheel bearing assembly 100 comprises an outer bearing member 112 which is secured to a steering knuckle 114 or other suitable support structure of the automobile by bolts or the like (not shown). The outer bearing member 112 has two integral angular contact outer raceways 116.

The wheel bearing assembly 100 further comprises a hollow spindle or inner bearing member 118 and two rows of bearing balls 120. The bearing balls in each row are circumferentially spaced from each other by a conventional separator 121. The inner bearing member 118 has an integral angular contact inner raceway 122 and a separate race 124 which is pressed on and retained by a keeper ring 125 to provide a second angular contact inner raceway 126. The rows of bearing balls 120 ride on the angular contact raceways 116, 122 and 126 and rotatably support the inner bearing member 118 in a fixed longitudinal relationship in the outer bearing member 112.

The hollow spindle 118 has a flange 128 for mounting a vehicle wheel (not shown) in a suitable manner such as by studs and bolts. The hollow spindle 118 also has a splined bore 130 by means of which an outer drive member or drive bell 132 of a front wheel drive axle (not shown) is drivingly connected to the hollow spindle 118 in a lash free manner.

More specifically, the drive bell 132 has an integral stub shaft 134 which has an intermediate splined portion 136 which includes a snap ring groove 138 near the free end portion 140 of the integral stub shaft 134 which has a pull groove 142. The wheel bearing assembly 100 also includes a Vee-shaped crush ring 144 which is disposed between the inboard end of the hollow spindle 118 and a shoulder 146 of the drive bell 132 when the integral stub shaft 134 is disposed in the splined bore 130.

The pull groove 142 at the free end portion 140 of the integral stub shaft 134 is engaged by a tool (not shown) to pull the integral stub shaft 134 through the splined bore 130 against the resistance of the crush ring 144 until the crush ring 144 is deformed enough to align the snap ring groove 138 with a shoulder 148 of the hollow spindle 118. A snap ring 150 is then assembled into the snap ring groove 138. The assembled snap ring 150 reacts against the shoulder 148 of the hollow spindle 118 to secure the hollow spindle 118 on the stub shaft 134 against the resistance of the deformed crush ring 144 which eliminates any lash in the driving connection between the hollow spindle 118 and the drive bell 132.

Figure 3:
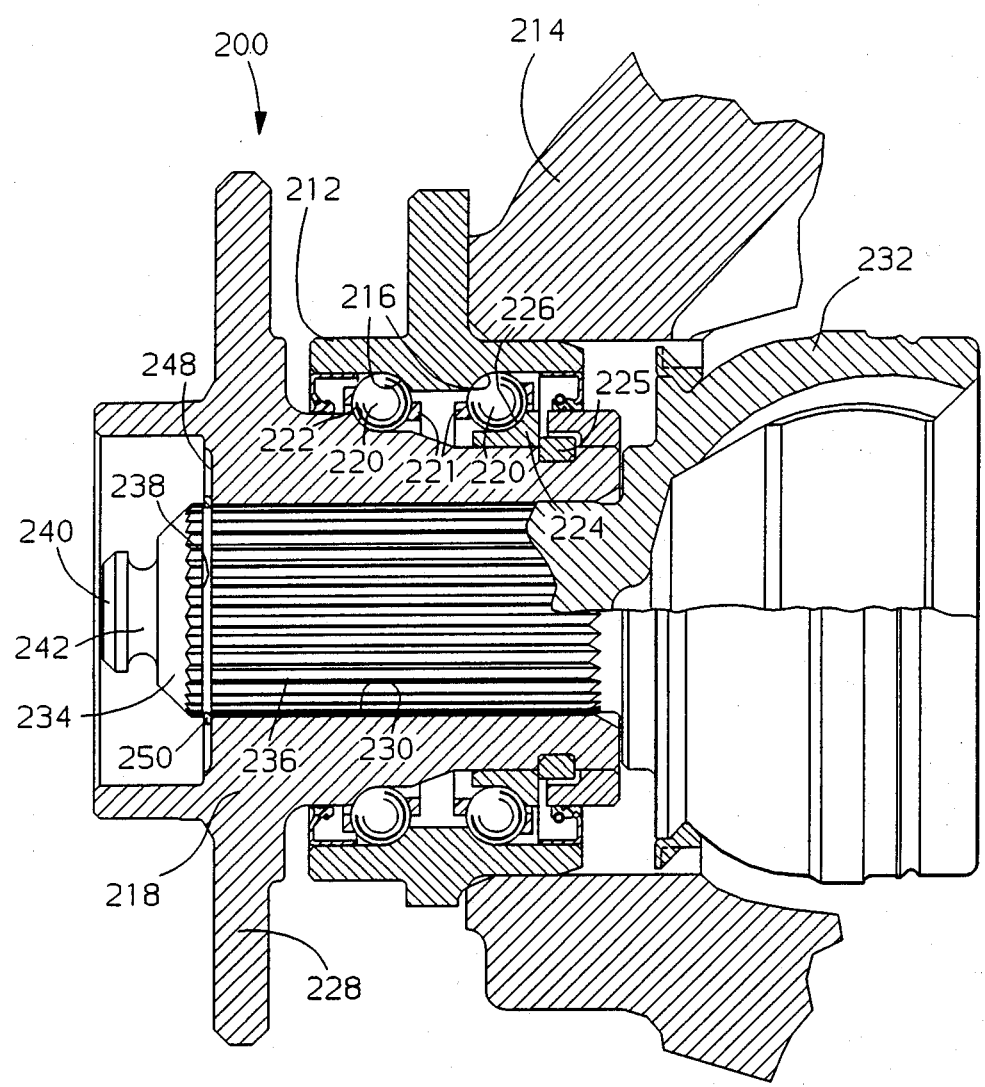
FIG. 3 is a longitudinal section of an alternate wheel bearing assembly for driven wheels in accordance with our invention.

An alternate wheel bearing assembly 200 in accordance with our invention is shown in FIG. 3.

The wheel bearing assembly 200 comprises an outer bearing member 212 which is secured to a steering knuckle 214 or other suitable support structure of the automobile by bolts or the like (not shown). The outer bearing member 212 has two integral angular contact outer raceways 216.

The wheel bearing assembly 200 further comprises a hollow spindle or inner bearing member 218 and two rows of bearing balls 220. The bearing balls in each row are circumferentially spaced from each other by a conventional separator 221. The inner bearing member 218 has an integral angular contact inner raceway 222 and a separate race 224 which is pressed on and retained by a keeper ring 225 to provide a second angular contact inner raceway 226. The rows of bearing balls 220 ride on the angular contact raceways 216, 222 and 226 and rotatably support the inner bearing member 218 in a fixed longitudinal relationship in the outer bearing member 212.

The hollow spindle 218 has a flange 228 for mounting a vehicle wheel (not shown) in a suitable manner such as by studs and bolts. The hollow spindle 218 also has a splined bore 230 by means of which an outer drive member or drive bell 232 of a front wheel drive axle (not shown) is drivingly connected to the hollow spindle 218. More specifically, the drive bell 232 has an integral stub shaft 234 which has an intermediate splined portion 236 which includes a snap ring groove 238 near the free end portion 240 of the integral stub shaft 234 which has a pull groove 242.

The splines of the splined bore 230 are straight or parallel to the axis of the hollow spindle 218 while the splines of the intermediate splined portion 236 of the stub shaft 234 are helical. A helix angle of about 11 minutes at the pitch diameter is suitable.

The pull groove 242 at the free end portion 240 of the integral stub shaft 234 is engaged by a tool (not shown) to pull the integral stub shaft 234 through the splined bore 230 against the resistance of the interengaging straight and helical spines until the snap ring groove 238 aligns with a shoulder 248 of the hollow spindle 218. A snap ring 250 is then assembled into the snap ring groove 238. The assembled snap ring 250 reacts against the shoulder 248 of the hollow spindle 218 to secure the hollow spindle 218 on the stub shaft 234 against the resistance of the interengaging straight and helical splines of the hollow spindle 218 and the stub shaft 234 which eliminates any lash in the driving connection.

We wish it to be understood that we do not desire to be limited to the exact details of construction shown and described, for obvious modifications will occur to a person skilled in the art.

The embodiments of the invention in which an exclusive property or privilege is claimed are defined as follows:

1. A wheel bearing assembly for a driven wheel of an automobile of the like comprising:
   an outer bearing member which is adapted to be secured to support structure of an automobile or the like and which has outer raceway means,
   an inner bearing member which is adapted for mounting a vehicle wheel and which has inner raceway means,
   bearing balls which ride on the raceway means to rotatably support the inner bearing member in a fixed longitudinal relationship in the outer bearing member,
   a drive member of a drive axle or the like, and
   means for drivingly connecting the drive member to the inner bearing member in a lash free manner comprising
   a splined bore of the inner bearing member, and
   a stub shaft of the drive member which has an intermediate splined portion and a free end portion which has a pull groove for pulling the stub shaft through the splined bore of the inner bearing member.

2. The wheel bearing assembly as defined in claim 1 wherein the means for drivingly connecting the drive member to the inner bearing member in a lash free manner further comprises:
   a snap ring groove in the stub shaft near the free end portion,
   a deformed crush ring which is disposed between an inboard end of the inner bearing member and a shoulder of the drive member, and
   a snap ring which is disposed in the snap ring groove and engages a shoulder of the inner bearing member to secure the inner bearing member on the stub shaft against the resistance of the deformed crush ring.

3. The wheel bearing assembly as defined in claim 1 wherein the means for drivingly connecting the drive member to the inner bearing member in a lash free manner further comprises:
   a snap ring groove in the stub shaft near the free end portion,
   the splined bore of the inner bearing member having splines, which are straight or parallel to the axis of the inner bearing member,
   the intermediate splined portion of the stub shaft having splines which are helical, and
   a snap ring which is disposed in the snap ring groove of the drive member and which engages a shoulder of the inner bearing member to secure the inner bearing member on the stub shaft against the resistance of the interengaging straight and helical splines of the inner bearing member and the stub shaft.

4. A wheel bearing assembly for a driven wheel of an automobile or the like comprising:
   an outer bearing member which is adapted to be secured to support structure of an automobile or the like and which has outer raceway means,
   a hollow spindle which is adapted for mounting a vehicle wheel and which has inner raceway means,
   bearing balls which ride on the raceway means to rotatably support the hollow spindle in a fixed longitudinal relationship in the outer bearing member,
   a drive bell of a drive axle or the like, and
   means for drivingly connecting the drive bell to the hollow spindle in a lash free manner including a splined bore of the hollow spindle and a integral stub shaft of the drive bell which has an intermediate splined portion and a free end portion which has a pull groove for pulling the stub shaft through the splined bore of the hollow spindle.

5. The wheel bearing assembly as defined in claim 4 wherein the means for drivingly connecting the drive bell to the hollow spindle in a lash free manner further includes:
- a snap ring groove in the stub shaft near the free end portion,
- a deformed crush ring which is disposed between an inboard end of the hollow spindle and a shoulder of the drive bell, and
- a snap ring which is disposed in the snap ring groove and engages a shoulder of the hollow spindle to secure the hollow spindle on the stub shaft against the resistance of the deformed crush ring.

6. The wheel bearing assembly as defined in claim 4 wherein the means for drivingly connecting the drive bell to the hollow spindle in a lash free manner further includes:
- a snap ring groove in the stub shaft near the free end portion,
- the splined bore of the hollow spindle having splines which are straight or parallel to the axis of the hollow spindle,
- the intermediate splined portion of the stub shaft having splines which are helical, and
- a snap ring which is disposed in the snap ring groove of the drive bell and which engages a shoulder of the inner bearing member to secure the hollow spindle inner bearing member on the stub shaft against the resistance of the interengaging straight and helical splines of the hollow spindle and the stub shaft.

* * * * *